No. 755,259. PATENTED MAR. 22, 1904.
J. H. TOOLE.
CUSHION TIRE.
APPLICATION FILED JAN. 2, 1904.

NO MODEL. 2 SHEETS—SHEET 1.

Witnesses:
Alberta Adamick
Harry L. Clapp

Inventor:
John H. Toole
By Fred Gerlach
his Attorney.

No. 755,259. PATENTED MAR. 22, 1904.
J. H. TOOLE.
CUSHION TIRE.
APPLICATION FILED JAN. 2, 1904.
NO MODEL. 2 SHEETS—SHEET 2.

Witnesses:
Alberta Adamick
Harry L. Clapp

Inventor:
John H. Toole.
By Fred Gerlach
his Attorney

No. 755,259. Patented March 22, 1904.

UNITED STATES PATENT OFFICE.

JOHN H. TOOLE, OF CHICAGO, ILLINOIS.

CUSHION-TIRE.

SPECIFICATION forming part of Letters Patent No. 755,259, dated March 22, 1904.

Application filed January 2, 1904. Serial No. 187,421. (No model.)

*To all whom it may concern:*

Be it known that I, JOHN H. TOOLE, residing at Chicago, in the county of Cook and State of Illinois, have invented certain new and useful Improvements in Cushion-Tires, of which the following is a full, clear, and exact description.

In cushion-tires having retaining-bands for securing the elastic body in the rim it has heretofore been common practice to embed in or extend through the elastic body or cushion element metallic supports for the bands. In practice it has been found difficult to construct elastic strips with the supports embedded therein, and the cost of manufacture thereof was materially increased by the process necessarily adopted in such manufacture and on account of the care necessary in accurately laying the supports in the compound or rubber. In some instances the elastic body was formed of parts separately formed and vulcanized together with the supports therebetween. Tires having metallic band-supports in the rubber are also objectionable because the resiliency of the tire is lessened by the metallic supports and because the metallic band-supports are destructive to the elastic body, when the tire is in use and often become loose and cut or abrade the elastic material, thus lessening the durability of the tire.

The present invention designs to overcome these objections and to provide metallic supports for the retaining band or bands, which are securely held in proper position with respect to the elastic body, but do not extend through the elastic material or body, so the band-support need not be embedded in the elastic body or extend therethrough.

The invention also designs to provide improved supports for the retaining-band, which do not affect the resiliency of the elastic body, and, further, to provide a cushion tire embodying an improved construction.

The invention consists in the several novel features hereinafter set forth, and more particularly defined by claims at the conclusion hereof.

Figure 1:
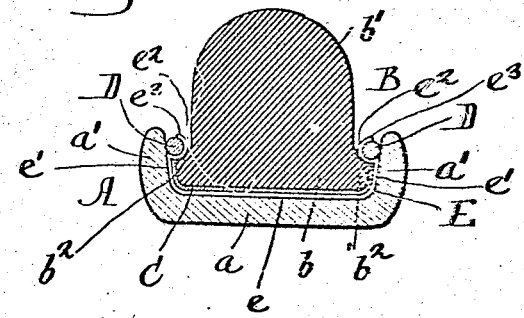
Figure 2:
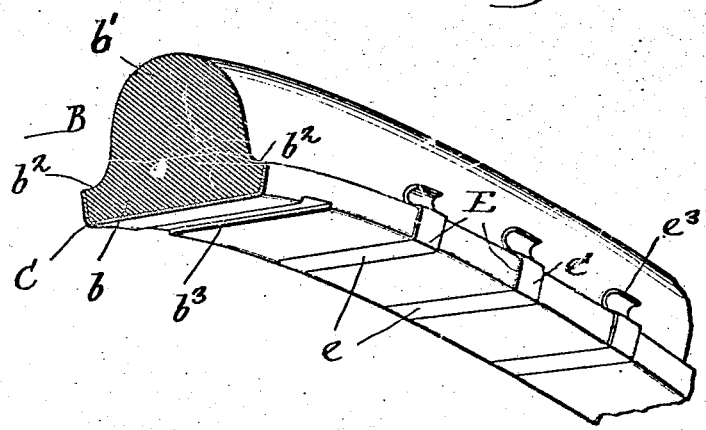
Figure 3:
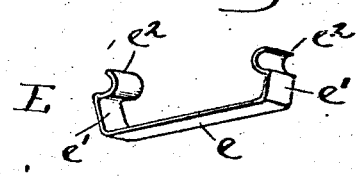
Figure 4:
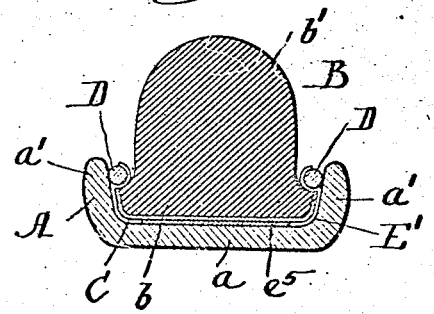
Figure 5:
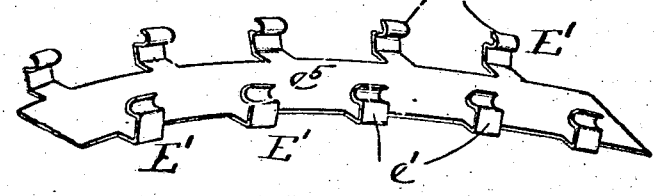
Figure 6:
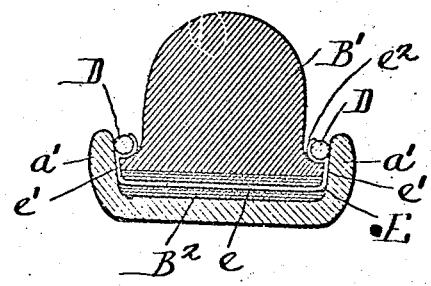

In the drawings, Figure 1 is a transverse section of a tire embodying one form of the invention. Fig. 2 is a perspective view of a portion of the elastic strip, some of the band-supports being shown in position adjacent the elastic body. Fig. 3 is a detail perspective of one of the band-supporting strips. Fig. 4 is a transverse section of a modified form of the invention. Fig. 5 is a perspective showing the band-supports of said modified form. Fig. 6 is a transverse section of another modification of the invention.

A denotes a metallic rim of usual construction and comprising a base $a$ and flaring side flanges $a'$, between which a channel is formed. An elastic strip or body B, usually formed of rubber or rubber compound, comprises a base portion $b$ and a tread portion $b'$, adapted to fit into the rim-channel. The base and sides of the elastic body may be lined with a strip of canvas C, if desired. Each side of body B is formed with a flange or seat $b^2$ for a retaining-band D, which extends longitudinally around body B to secure the elastic body to the rim.

A series of supports E, formed of metal, secure the retaining-bands in position at the sides of the elastic body and effectively prevent cutting or wear of said body by the retaining-bands. Each support E comprises a transverse portion or bar $e$ and sides or legs $e'$, each of which has a curved upper or outer terminal $e^2$. Said terminals overlie the side flanges of the elastic body and are adapted to receive one of the retaining-bands. Bars $e$ fit in recesses or seats $b^3$, formed in the base of the elastic body, and thereby the supports are longitudinally positioned or spaced along said body. Supports E are usually formed of thin slightly resilient or flexible strips, so the seat-terminals $e^2$ can be sprung or forced into position about the elastic body. The upper ends of seat-terminals $e^2$ are preferably bent away from the elastic body, as at $e^3$, so the sides of the tread portion of the body will not be cut or abraded as a result of compression and lateral play of the body, which occur when the tire is in use. Said ends $e^3$ are arranged within the outer edges of the rim, so they will not come in contact with the ground.

The longitudinal retaining-bands when in position to secure the tire engage the projecting flanges or seats $b^2$ of the elastic body and also rest in the seats of supports E. Therefore the tightly-drawn bands will firmly secure the elastic body or strip in the rim, but without danger of cutting or wearing the elastic strip. The sides $e'$ of supports E are firmly clamped between the rim sides and the base portion of the elastic body, and the connecting-strips $e$ of said supports are firmly clamped between the bases of the elastic body and rim. The retaining-bands are located at the sides of the elastic body and adjacent the rim, so the bands are confined against outward movement by the rim. The seats $e^2$ of supports E, within which the retaining-bands rest, prevent inward movement of the bands and cutting and wear of the elastic body by the bands, such as would result from compression and lateral strains to which the tire is subjected when in use. Seats $e^2$ are slightly depressed to hold the bands so they cannot slip between the elastic body and rim side, which often occurs when the ends of cross-supports heretofore used become worn or broken.

In Figs. 4 and 5 there is shown a modified form of the invention in which the band-supports are formed of a long strip of thin flexible metal cut and bent to form a longitudinally-extending base-strip $e^3$, adapted to lie between the base of body B and the rim-base and to form band-supports E', which are integrally formed therewith, and sustain the bands in the same manner as the supports E hereinbefore described. In this form the connecting-strip $e^3$ spaces the supports along the elastic body and permits the supports to be bent for rims of different diameters.

In Fig. 6 there is shown one way of applying the supports to a tire which is formed of an elastic body B' and a base B² of superposed layers of textile fabric. In this form of the invention the bars $e$ of the band-supports are placed between the layers of the fabric base, which are vulcanized together between the supporting-strips.

Manifestly the invention provides supporting means for a retaining-band, which can be applied to the tire independently of the elastic body—i. e., without embedding the support in or extending the support through the elastic body. The supports shown are clasped around the elastic body and can be readily applied after the elastic body has been formed. The seats of the band-supports secure the bands against inward tendency likely to cut or abrade the elastic body, and, moreover, the bands are effectively secured against lateral movement in either direction. It will also be observed that the supports extend between the elastic body and rim, between which they are firmly clamped and held. Furthermore, by extending the supports between the base of the rim and the elastic body the supports are better secured against longitudinal and transverse strains.

The invention is not to be understood as restricted to the particular embodiment shown and described, and may be modified without departing from the spirit and scope of the invention.

Having thus described the invention, what I claim as new, and desire to secure by Letters Patent, is—

1. In a cushion-tire, the combination with a rim, of an elastic body having a longitudinal seat, a retaining-band around said seat, and extending around said body, and a series of band-supports independent of the elastic body and separate from the band.

2. In a cushion-tire, the combination with a rim, of an elastic body, a retaining-band at each side of the body and a series of band-supports, independent of the elastic body and separate from said band.

3. In a cushion-tire, the combination with a rim, of an elastic body having a longitudinal seat, a retaining-band, and a series of band-supports extending between the sides of the body and the rim, and having seats formed therein, said band extending around said seats.

4. In a cushion-tire, the combination with a rim, of an elastic body having a longitudinal seat, a retaining-band around said seat, and a series of band-supports extending between the side of the body and the rim, and beneath the elastic body.

5. In a cushion-tire, the combination with a rim, of an elastic body, a retaining-band at each side of the body, and a series of band-supports between the side of the body and the rim, and extended beneath the elastic body.

6. In a cushion-tire, the combination with a rim of an elastic body having longitudinal seats, a plurality of retaining-bands engaging said seats, and a series of band-supports at each side, the supports at one side being connected to those on the other, across the rim-channel and beneath the elastic body.

7. In a cushion-tire, the combination with a rim, of an elastic body, a retaining-band at each side of the body, and a series of band-supports at each side, the supports at one side being connected to those on the other, across the rim-channel and beneath the base of the elastic body.

8. In a cushion-tire, the combination with a rim, of an elastic body, a retaining-band at each side of the body and a series of band-supports at each side, the supports at one side being connected to those on the other, across the rim-channel beneath the base of the elastic body, the supports having seats therein.

9. In a cushion-tire, the combination with a rim, an elastic body having a longitudinal seat, a retaining-band, extending around said seat, and a series of band-supporting strips overlying said seat and having legs adjacent a side of the body and within the rim.

10. In a cushion-tire, the combination with a rim, an elastic body having a longitudinal seat, a retaining-band, extending around said seat, and a series of band-supporting strips having seats overlying said longitudinal seat and having legs adjacent a side of the body and within the rim.

11. In a cushion-tire, the combination with a rim, an elastic body having a longitudinal seat, a retaining-band, extending around said seat, a series of band-supporting strips overlying said longitudinal seat, having legs adjacent a side of the body and extended beneath the body.

12. In a cushion-tire, the combination with a rim of an elastic body, a retaining-band at each side of the body, and a series of band-supporting strips fitting around the base and sides of the elastic body.

13. In a cushion-tire, the combination with a rim of an elastic body, a retaining-band at each side of the body, and a series of band-supporting strips fitting around the base and sides of the elastic body and having seats therein.

14. In a cushion-tire, the combination with a rim, of an elastic body having a flange or seat formed, on each of its sides, a retaining-band extending around each of the flanges and a series of band-supporting strips each of which fits around the base and sides of the elastic body and lies between the body and the band.

15. In a cushion-tire, the combination with a rim, of an elastic body having a flange or seat formed on each of its sides, a retaining-band extending around each of the flanges and a series of band-supports, each fitting between the base of the elastic body and the rim.

16. In a cushion-tire, the combination with a rim, of an elastic body having a flange or seat formed on each of its sides, a retaining-band extending around each of the flanges and a series of band-supports fitting between the base of the elastic body and the rim, each support extending between one of the bands and the body.

17. In a cushion-tire, the combination with a rim, of an elastic body having a flange or seat formed on each of its sides, a retaining-band extending around each of the flanges and a series of band-supports fitting between the base of the elastic body and the rim, each support extending between one of the bands and the body and having seats therein.

18. In a cushion-tire, the combination with a rim, of an elastic body having a flange or seat formed on each of its sides, a retaining-band extending around each of the flanges and a series of band-supports extending across the rim-channel, and fitting between the base of the body and the rim, and each support extending between one of the bands and the body.

JOHN H. TOOLE.

In presence of—
 FRED GERLACH,
 ALBERTA ADAMICK.